(12) United States Patent
Conroy et al.

(10) Patent No.: US 8,128,323 B2
(45) Date of Patent: Mar. 6, 2012

(54) DRIVEN TOOL ASSEMBLY

(75) Inventors: John Brian Conroy, Cincinnati, OH (US); Terrance Edward Ekstedt, Cincinnati, OH (US)

(73) Assignee: Planet Products Corporation, Cincinnati, OH (US)

( * ) Notice: Subject to any disclaimer, the term of this patent is extended or adjusted under 35 U.S.C. 154(b) by 532 days.

(21) Appl. No.: 12/423,474

(22) Filed: Apr. 14, 2009

(65) Prior Publication Data

US 2010/0260563 A1 Oct. 14, 2010

(51) Int. Cl.
*B23Q 11/12* (2006.01)
*B23Q 11/10* (2006.01)

(52) U.S. Cl. ........ 409/135; 409/136; 409/230; 409/131; 408/61

(58) Field of Classification Search ............... 408/56–61; 279/20; 407/11; 409/135–136, 144, 230, 409/234, 131; *B23Q 3/12, 11/10, 11/12*
See application file for complete search history.

(56) References Cited

U.S. PATENT DOCUMENTS

| | | | |
|---|---|---|---|
| 1,635,590 A * | 7/1927 | Travis | 408/42 |
| 3,062,104 A | 11/1962 | Deflandre | |
| 3,567,975 A | 3/1971 | Biesack et al. | |
| 3,774,983 A | 11/1973 | Lagally | |
| 3,929,393 A | 12/1975 | Marantette et al. | |
| 3,985,367 A | 10/1976 | Martino et al. | |
| 4,046,431 A | 9/1977 | Harris | |
| 4,293,251 A | 10/1981 | Anderson | |
| 4,543,019 A | 9/1985 | Shikata | |
| 4,598,617 A | 7/1986 | Kubo et al. | |
| 4,602,874 A | 7/1986 | Neugebauer | |
| 4,668,135 A | 5/1987 | Hunt | |
| 4,778,315 A | 10/1988 | Duffy et al. | |
| 4,793,424 A | 12/1988 | Lim, Jr. | |
| 4,815,899 A | 3/1989 | Regan | |
| 4,981,403 A * | 1/1991 | Katayama | 409/136 |
| 5,077,876 A | 1/1992 | McConkey | |
| 5,295,772 A * | 3/1994 | Ueda et al. | 409/232 |
| 5,297,657 A | 3/1994 | McConkey | |
| 5,419,661 A | 5/1995 | Meachum | |

(Continued)

FOREIGN PATENT DOCUMENTS

DE 3929801 C * 1/1991

(Continued)

OTHER PUBLICATIONS

PCT International Search Resort and Written Opinion dated Aug. 2, 2010.

(Continued)

*Primary Examiner* — Daniel Howell
(74) *Attorney, Agent, or Firm* — Hasse & Nesbitt LLC; W. Charles Ehlers; Donald E. Hasse (57) ABSTRACT

A driven tool assembly that uses the cutting tool coolant to also lubricate and cool the driven tool. The driven tool housing has at least one coolant intake port, at least one coolant discharge port, and a shank for mounting the driven tool assembly to a machine tool. An input shaft and an output shaft are rotatably mounted in the driven tool housing, and a transmission transmits power from the input shaft to the output shaft. A seal is disposed between the housing and the input shaft. Typically, at least one passageway fluidly communicates the coolant intake port with the input shaft, the output shaft, the transmission, the bearings, and the coolant outlet port.

20 Claims, 6 Drawing Sheets

U.S. PATENT DOCUMENTS

| | | | |
|---|---|---|---|
| 5,549,177 | A | 8/1996 | Hosokawa et al. |
| 6,036,413 | A | 3/2000 | Chandrasekar |
| 6,050,756 | A | 4/2000 | Buchholz et al. |
| 6,116,825 | A | 9/2000 | Kammermeier et al. |
| 6,210,083 | B1 | 4/2001 | Kammermeier et al. |
| 6,874,977 | B2 | 4/2005 | Cook et al. |
| 7,147,410 | B2 | 12/2006 | Jansen |
| 7,384,104 | B2 | 6/2008 | Sugden |
| 7,563,062 | B1 * | 7/2009 | Chen .................... 409/230 |
| 2002/0176758 | A1 | 11/2002 | Sahm et al. |
| 2003/0102287 | A1 | 6/2003 | Katsumata et al. |
| 2004/0079207 | A1 | 4/2004 | Matsumura et al. |

FOREIGN PATENT DOCUMENTS

| | | | |
|---|---|---|---|
| DE | 1035419 A1 | * | 2/2003 |
| JP | 03142144 A | * | 6/1991 |
| JP | 04354652 A | * | 12/1992 |
| JP | 06198538 A | * | 7/1994 |
| JP | 11221736 A | * | 8/1999 |

OTHER PUBLICATIONS

Arpaio, Jerry; Through-Coolant Tools Raise Throughput, *Cutting Tool Engineering, Plus*; Mar. 1999, vol. 51 No. 2, pp. 1-6.

ELTOOL; TITESPOT® Coolant Driven Drill Heads; www.eltool.com (© 2003ELTOOL Corp.)pp. 1-6.

Hoeting, Steven,"Protecting Machine Tool Spindle Bearings", *Manufacturing Engineering*, Jul. 2001, vol. 127 No. 1, pp. 1-5.

The George Whalley Company; Coolant-Fed Tooling & Systems® Division, V-Flange End Mill Holders, Single Pin O-Ring Rotary Coolant Gland; www.coolantfedtooling.com (© 2006 The George Whalley Company) pp. 1-2.

\* cited by examiner

DRIVEN TOOL ASSEMBLY

FIELD OF THE INVENTION

This invention relates generally to holders for use with cutting tools, and relates specifically to a driven tool assembly that uses the same coolant for lubricating and cooling the housing, bearings, and gears of the driven tool assembly as it does to cool and lubricate the cutting tool and the workpiece.

BACKGROUND OF THE INVENTION

Whether driven or stationary, cutting tools used for operations such as drilling, milling, or reaming metal workpieces, remove unwanted material from a part by shearing it away from the parent material. This shearing action develops heat. As such, cutting tools frequently require coolant at the interface between the workpiece and the cutting surface of the cutting tool. Coolant reduces the heat generated by the machining operation by reducing the friction between the cutting tool and the workpiece and by transferring heat from the cutting tool and workpiece to the coolant. Such heat reduction is important, as excessive heat prematurely dulls the cutting tool, lowers the quality of cuts produced by the cutting tool, and shortens the useful lifespan of the cutting tool. As one of ordinary skill in the art would recognize, the coolant can be a variety of fluids, including water, water with an oil emulsion, oil, air, air entrained with oil, carbon dioxide, or other compounds.

Systems for providing coolant at the interface between cutting tools and their respective workpieces are known in the art. Some coolant systems supply coolant through the center of the cutting tool ("through-center coolant systems"), while others direct a stream of coolant at the interface between the cutter and the workpiece. For example, U.S. Pat. No. 5,419,661 discloses a method for providing coolant through the center of a driven tool assembly while at the same time keeping the coolant separate from the oil or grease used to lubricate and cool the gears and bearings within the driven tool assembly housing. Usually, the through-center coolant systems require high pressure coolant for their operation, while coolant systems that externally direct coolant to the cutter/workpiece interface often operate at low pressures.

Driven tools have long been known and widely used in lathes, turning centers, machining centers and other machine tools to produce features on parts in addition to the rotationally symmetrical features normally associated with machining (or "turning") on a lathe or other machine tool. A driven tool assembly cuts keyways, key seats, holes, and other features that may not be located on the rotational axes of the part. The tooling that produces these features contains powered (sometimes referred to as "live" or "driven") cutters that can remove the material from the part whether or not the main lathe spindle axis is rotating. Although there are other means for operating these cutting tools, the turret on a lathe or machine tool is what commonly indexes and drives the driven tool assembly. The turret can store the cutting tools and index them into the cutting position.

Driven tool assemblies traditionally have an input shaft for receiving rotatable power from the machine tool or from an integrated power supply and an output shaft with a device for holding a cutting tool. A spindle is one example of a type of output shaft. A housing and bearings support the input and output shafts, and gears or other means for power transmission transmit power from the input shaft to the output shaft. The bearings may be rolling element devices (anti-friction bearings), sliding contact devices (plain bearings), or other types of friction reducing devices, including hydro-static bearings, in which the spindle rides on a film of fluid. Traditionally, oil or grease lubricate the driven tool's gears and bearings.

Conventional driven tool assembly design strives to isolate the oil or grease bearing lubricant from the cutting coolant using seals. It is not uncommon for a driven tool assembly to operate at 5000 rpm. At these high speeds, the driven tool assembly generates considerable heat within the bearings, limiting the amount of time the driven tool assembly may be operated before it is allowed to cool. Additionally, the seals between the rotating surfaces of the shafts and the stationary walls of the housing apply a substantial amount of frictional drag, increasing the power required to effectively turn the cutting tool and generating additional heat. If the operator exceeds the running time, then the driven tool assembly may overheat, causing the seals to fail, the lubricant to escape, and coolant to leak into the driven tool assembly. While coolants used in the past may have been oil based coolants, the vast majority of today's coolants are water based coolants containing 90-95% water. Because the gear lubricant and the coolant are often incompatible, the coolant will wash away the remaining gear lubricant, causing bearing failure. Even if the driven tool assembly is salvageable, it is expensive to rebuild the tool and make it serviceable again. What is needed is a driven tool assembly that uses the cutting tool coolant to also lubricate and cool the driven tool assembly. Ideally, the driven tool assembly may also be operated continuously without overheating, may have high duty life, and may use a low pressure coolant source.

SUMMARY OF THE INVENTION

Generally, the invention has been developed with a view to respond to the above described disadvantages and inconveniences inherent in the other systems. The invention thus relates to a driven tool assembly having a coolant feed system that uses the cutting coolant to also cool and lubricate the driven tool assembly.

One embodiment of the present invention is a driven tool assembly comprising a housing having at least one coolant intake port, at least one coolant discharge port, and a shank for mounting the driven tool assembly to a machine tool, an input shaft rotatably mounted in said housing, a seal disposed between said housing and said input shaft, an output shaft rotatably mounted in said housing, a transmission communicating with said input shaft and with said output shaft, whereby said transmission transmits power from said input shaft to said output shaft, at least one passageway in fluid communication with said coolant intake port and said coolant discharge port, said passageway also in fluid communication with said input shaft, said output shaft, and said transmission, whereby coolant lubricates and cools said shafts and said transmission while flowing from said coolant intake port to said coolant discharge port, and said coolant discharge port positioned remote from said output shaft.

Another embodiment of the invention is a driven tool assembly comprising a housing having at least one coolant intake port, at least one coolant discharge port, and a shank for mounting the driven tool assembly to a machine tool, at least one first bearing mounted in said housing, at least one second bearing mounted in said housing, an input shaft located concentrically within said first bearing, a seal disposed between said housing and said input shaft, an output shaft located concentrically within said second bearing, a transmission communicating with said input shaft and said output shaft, whereby said transmission transmits power from said input shaft to said output shaft, at least one first passageway in fluid communication with said coolant intake port and with said coolant discharge port, whereby coolant flows from said coolant intake port through said first passageway to said coolant discharge port, at least one second passageway in fluid communication with said first passageway and input shaft, output shaft, first bearing, second bearing, and transmission, whereby coolant flowing through said second passageway lubricates and cools said input shaft, output shaft, first bearing, second bearing and transmission, and said coolant discharge port positioned remote from said output shaft.

The invention also relates to a method for cooling and lubricating a driven tool assembly, comprising providing a driven tool assembly comprising a housing having at least one coolant intake port, at least one coolant discharge port, and a shank for mounting the driven tool assembly to a machine tool, an input shaft rotatably mounted in said housing, a seal disposed between said housing and said input shaft, an output shaft rotatably mounted in said housing, a transmission communicating with said input shaft and with said output shaft, at least one passageway in fluid communication with said coolant intake port and said coolant discharge port, said at least one passageway also in fluid communication with said input shaft, said output shaft, and said transmission, and said coolant discharge port positioned remote from said output shaft, distributing coolant to a coolant intake port, circulating coolant through at least one passageway to cool and lubricate said driven tool assembly, passing said coolant through said coolant outlet port, and cooling and lubricating a cutting tool and workpiece with said coolant exiting said coolant outlet port.

DETAILED DESCRIPTION OF THE DRAWINGS

Figure 2:
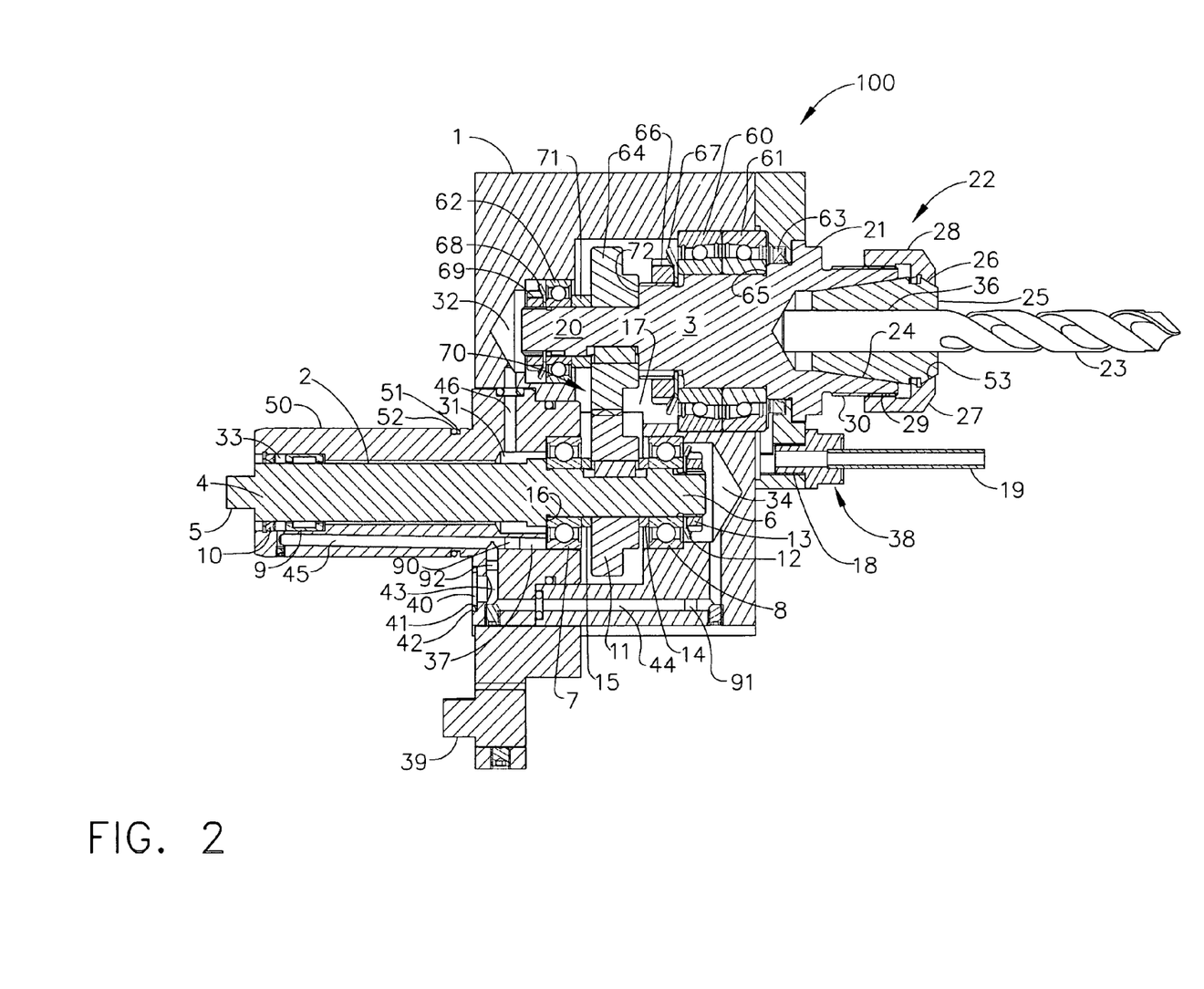
FIG. 2 is a cross-sectional view along line 2-2 of the embodiment of FIG. 1, also depicting a cutting tool.
Figure 3:
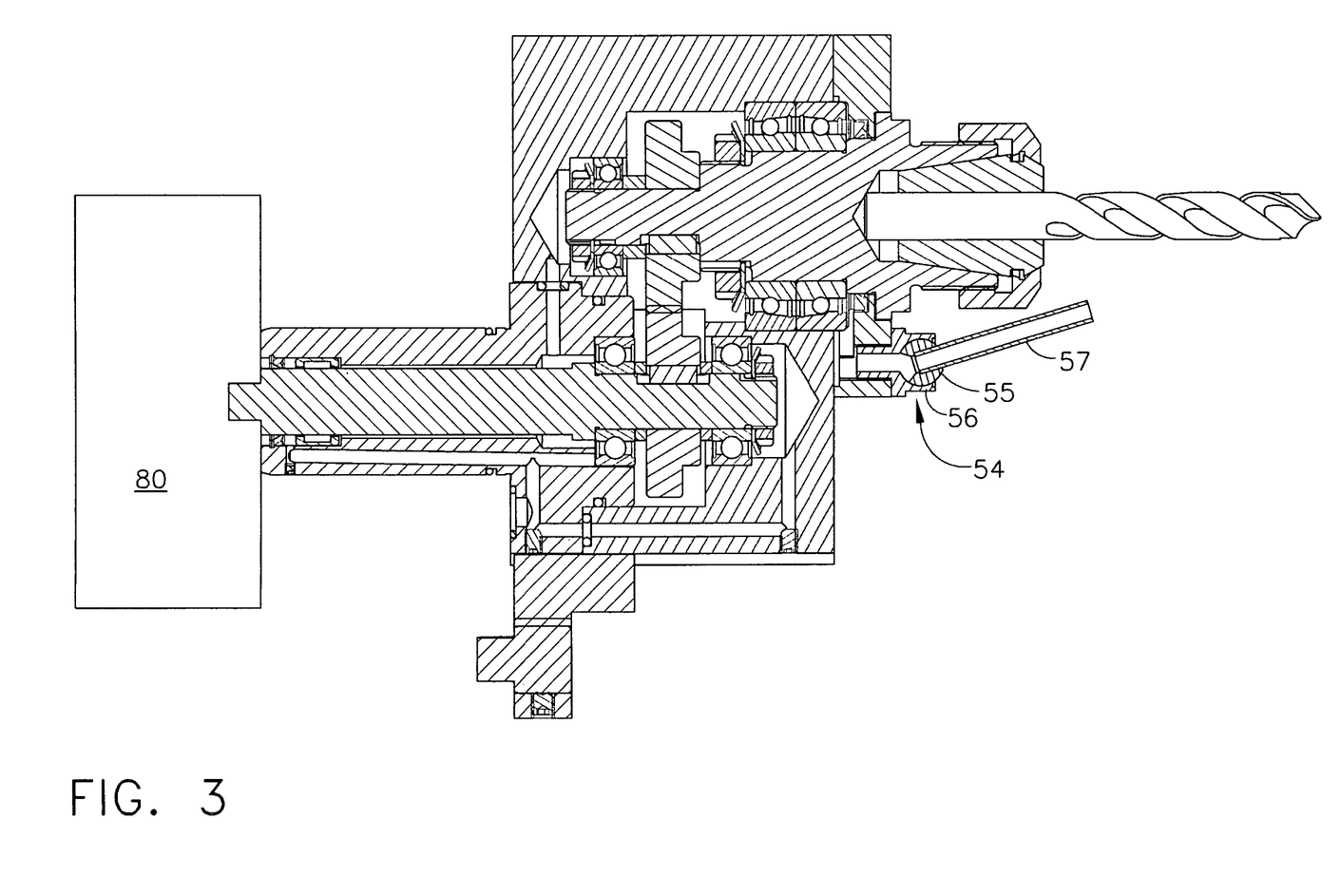
FIG. 3 is a cross-sectional view of an embodiment similar to that shown in FIG. 2, also depicting an integral power supply and an adjustable nozzle.

With reference to FIG. 2, the driven tool assembly 100 generally comprises a housing 1, an input shaft 2 rotatably mounted in the housing, and an output shaft 3 rotatably mounted in the housing. The distal end 4 of the input shaft 2 includes a drive tang 5 which is receivable into a complementary shaped recess of a machine tool drive mechanism (not shown). Alternatively, as shown in FIG. 3, the driven tool assembly may be provided with its own means for providing rotatable power to the input shaft 2, such as integral power source 80, e.g., a hydraulic or electric motor. Referring again to FIG. 2, the housing 1 includes a shank 50 for mounting the driven tool assembly 100 to a machine tool (not shown). Typically, the shank 50 is clamped into the turret of a machine tool. A locating device 39 is slideably attached to the housing 1 and mates with the machine tool (not shown). A groove 51 is concentrically disposed on a shank 50 for receiving an O-ring 52. The input shaft further includes a proximal end 6 rotatably mounted in a wall of the driven tool assembly housing 1 by means of two rotary bearings 7 and 8. The distal end 4 of the input shaft 2 is rotatably mounted in the housing 1 by a bearing 9. A seal 10 is disposed between the shank 50 area of the housing 1 and the input shaft 2 for minimizing coolant leakage into the driven tool assembly drive mechanism. A gear 11 for transmitting rotatable power from the input shaft 2 to the output shaft 3 is disposed on the proximal end 6 of the input shaft 2 between bearings 7 and 8. A locking washer 12 and locknut 13 secure a bearing 8, spacer 14, gear 11, spacer 15 and bearing 7 against the input shaft shoulder 16.

The output shaft 3 has a proximal end 20 and a distal end 21. The distal end 21 of the output shaft 3 is rotatably mounted in a wall of the housing 1 by means of two rotary bearings 60 and 61, and is further provided with a seal 63 disposed between the housing 1 and the output shaft 3 for minimizing coolant leakage. A locking washer 67 and locknut 66 secure bearings 60 and 61 against the output shaft shoulder 65. The proximal end 20 of the output shaft 3 is rotatably mounted in the housing 1 by a bearing 62. A gear 64 for receiving rotatable power transmitted from a gear 11 disposed on the input shaft 2 is disposed on the output shaft 3. A locking washer 68 and locknut 69 secure a gear 64, spacer 71, and bearing 62 against the proximal output shaft shoulder 72.

Figure 1:
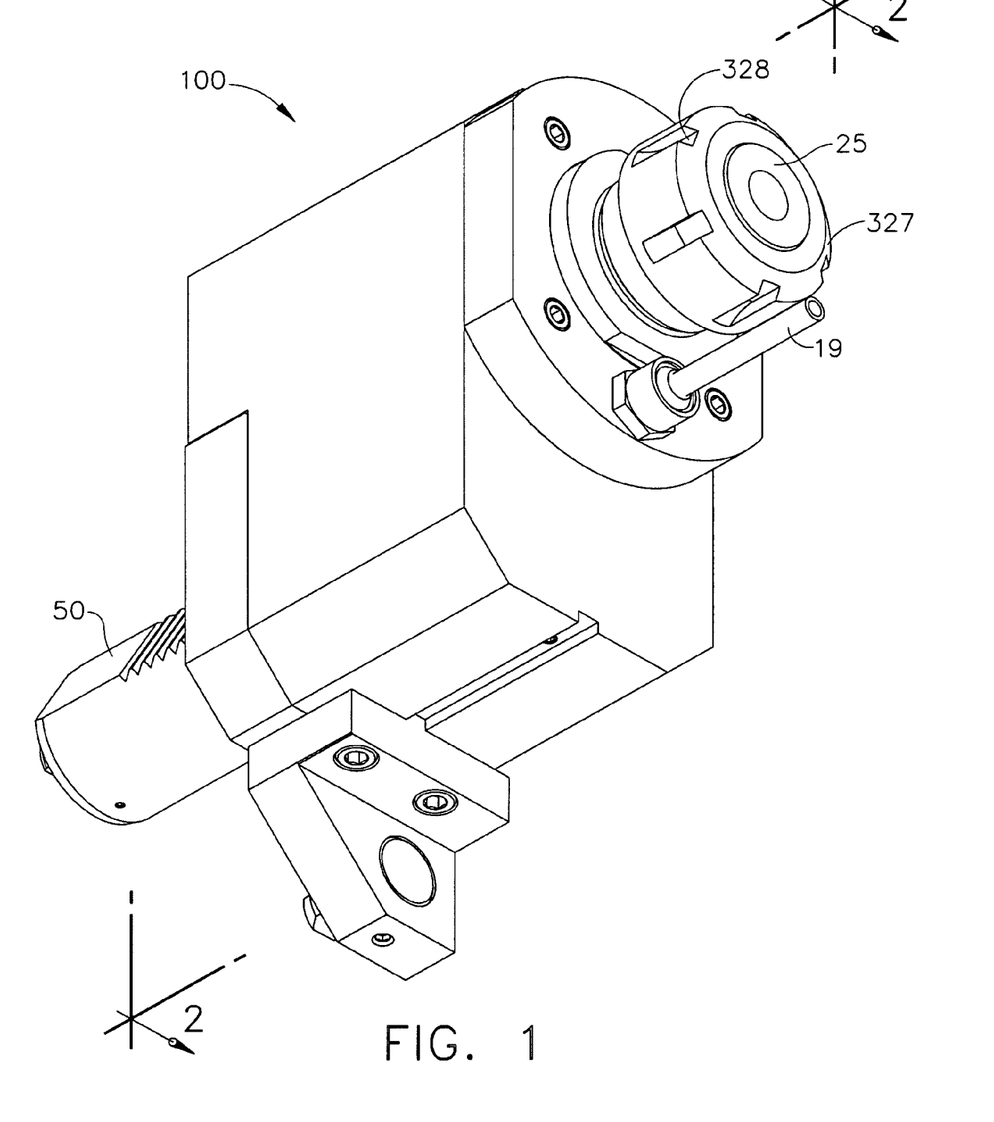
FIG. 1 is a perspective view of one embodiment of the invention, showing a driven tool assembly with offset input and output shafts.

The distal end 21 of the output shaft 3 includes an integral collet chuck 22 for detachably holding the shank end 36 of a cutting tool 23. Other tool holders for attaching cutting tools to the input shaft may be utilized. For example, the output shaft may have means, such as threads, for receiving a detachable collet chuck or other tool holding device. The collet chuck 22 has a generally tubular chuck body 24 that receives a tubular collet 25. The collet 25 terminates at a beveled edge 26 for flexing the distal end of the collet inwardly. A locknut 27 is concentrically disposed around the distal end of the collet 25 and the chuck body 24. Wrench receiving means 28 are circumferentially disposed on the locknut 27 to facilitate the turning thereof. As depicted in FIG. 1, one embodiment of the wrench receiving means provides a series of longitudinally oriented slots 328 for receiving a spanner wrench circumferentially disposed on the locknut 327. Alternatively, the locknut 327 may have other wrench receiving means, such as wrench flats, circumferentially disposed on the locknut 327. The distal end of the locknut 27 has a beveled edge 53 complementary in shape to the beveled edge 26 of the collet 25. The inner diameter of the proximal end of the locknut 27 is circumscribed by screw threads 29 engageable by screw threads 30 circumscribing the distal end of the chuck body 24. When the locknut 27 is tightened, the beveled edge 53 of the locknut 27 wedgingly squeezes the distal end of the collet 25 inward such that the inner diameter of the collet 25 tightly grips the shank 36 of the cutting tool 23. In order to render the collet 25 rotatably compressible by the beveled edge 53 of the locknut 27, a plurality of longitudinally orientated slots are provided around the circumference of the collet 25.

In the embodiment of FIG. 2, a transmission 70 utilizes gears 11 and 64 for transmitting power from the input shaft to the output shaft. The transmission may transmit power from the input shaft 2 to the output shaft 3 by a variety of means, including gears, couplings, sprockets and a chain, direct drives, or any other mechanisms available to rotatably transmit power from one shaft to another. Also, the sizes of gears 11 and 64 may be varied to produce either a higher tool speed or greater torque.

Figure 4:
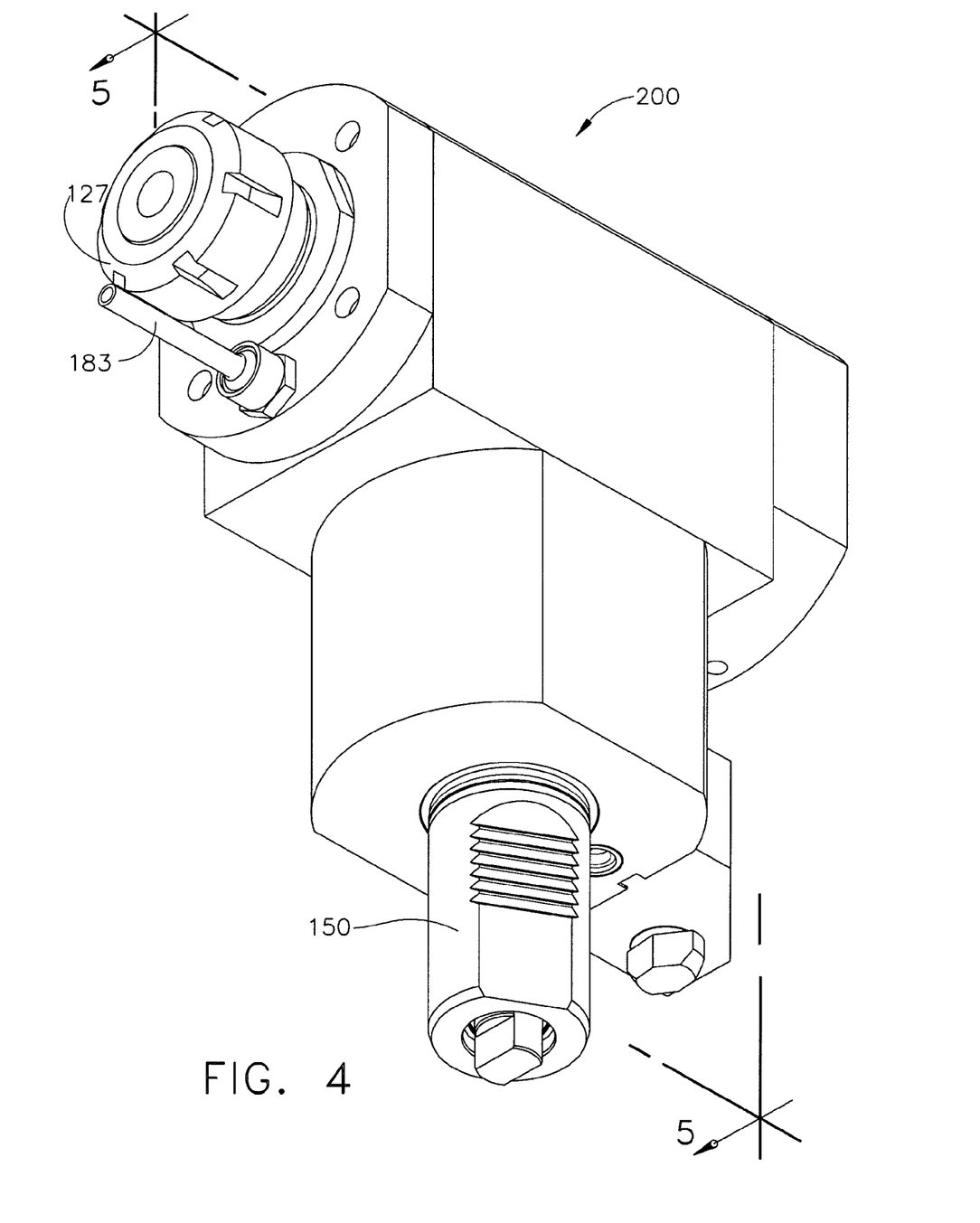
FIG. 4 is a perspective view of another embodiment of the invention, showing a driven tool in which the input shaft and the output shaft are orientated at right angles to each other.
Figure 5:
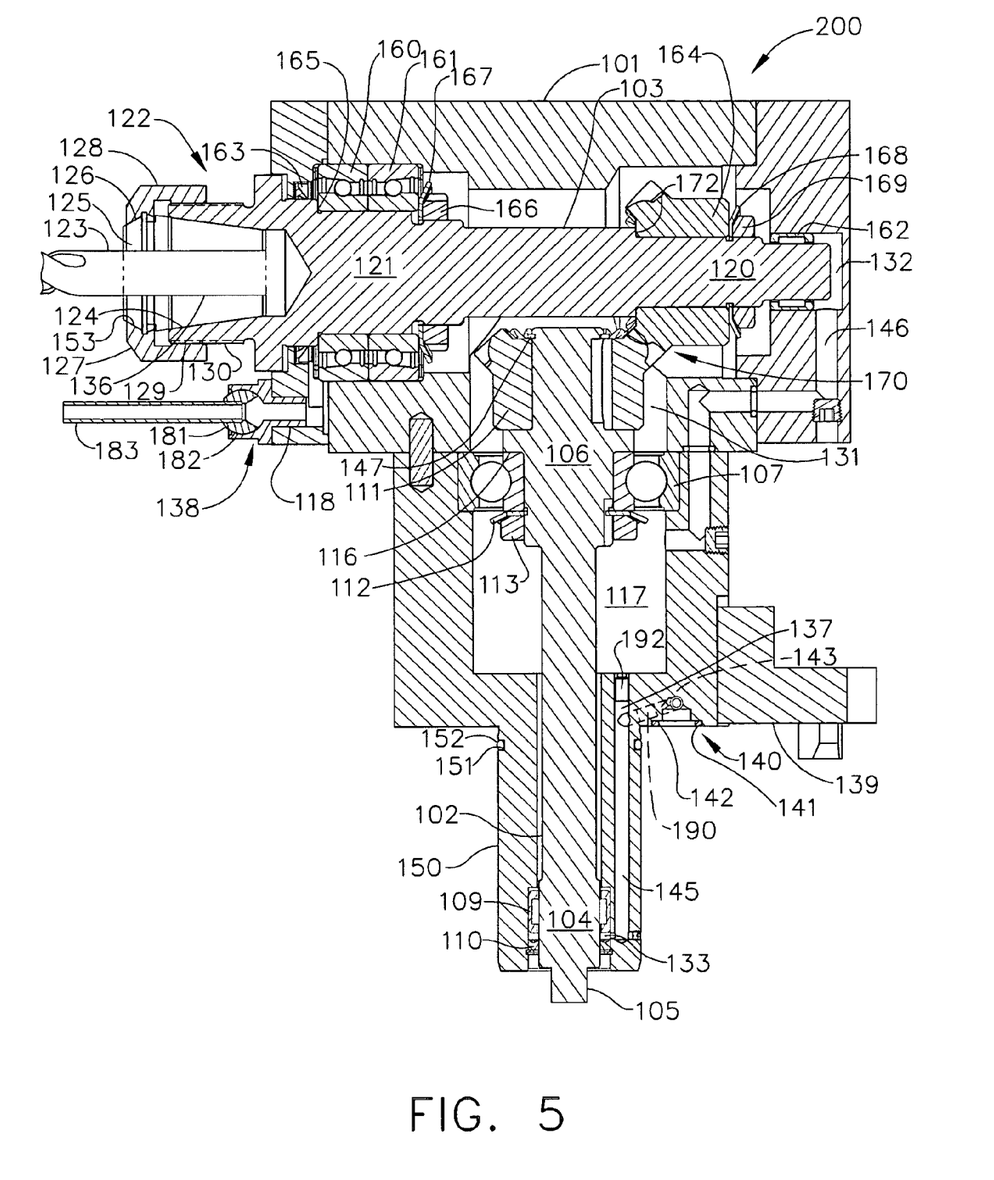
FIG. 5 is a cross-sectional view along line 5-5 of the embodiment of FIG. 4.
Figure 6:
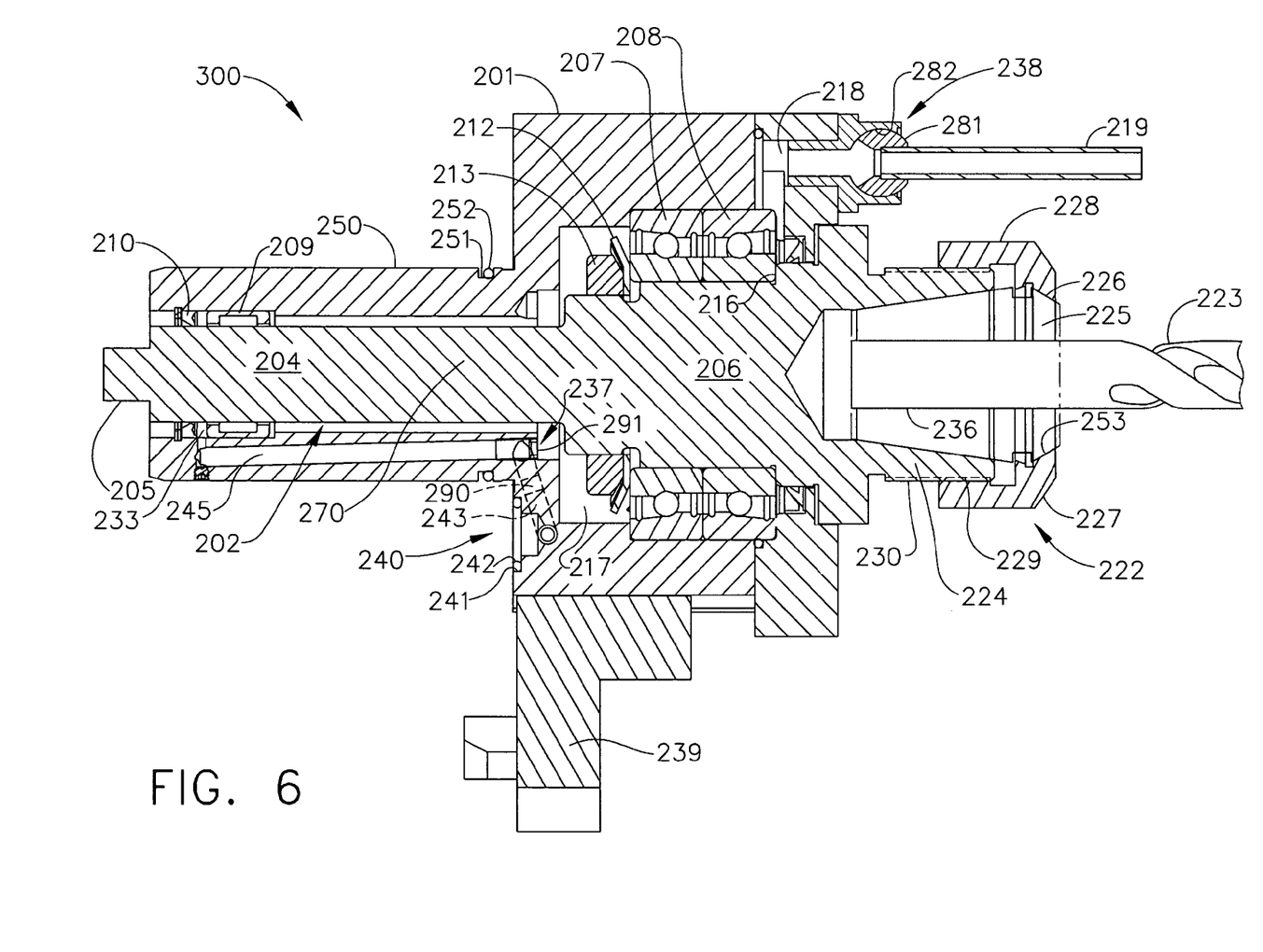
FIG. 6 is a cross-sectional view of another embodiment of the invention, in which the input shaft and the output shaft are coaxial.

While the embodiment in FIG. 2 shows the input shaft 2 and the output shaft 3 having parallel axes, other shaft alignments are within the scope of this invention. For example, the embodiment in FIG. 6 shows a driven tool assembly 300 in which the input and output shafts are coaxial. The transmission may be an integral part of the input and the output shafts, and in FIG. 6, the input and output shafts are a single piece such that the transmission is incorporated into the shafts. Additionally, a driven tool assembly may use a power transmission comprising bevel gears, so that the axes of the input and output shaft are not parallel. FIGS. 4 and 5 depict one example of such an embodiment resulting in a right angle driven tool assembly 200. Additionally, another example of the invention may incorporate an adjustable transmission in which the operator may adjust the angle between the input and output shafts.

The housing 1 contains a coolant intake port 40. A groove 41 circumscribes the coolant intake port 40 and receives an O-ring 42. The O-ring 42 provides a coolant seal between the driven tool assembly and the turret. While this embodiment shows the coolant intake port disposed adjacent to the input shaft, the coolant intake port may be disposed in a variety of locations. For instance, the input shaft may have a continuous axial bore from the distal end of the input shaft to the proximal end of the input shaft. In such an embodiment, the machine tool introduces coolant into the distal end 4 of the input shaft 2, and the coolant flows through the input shaft, out of the proximal end 6 of the input shaft 2 and into the housing interior 17. By way of another example, a seal 10 may be removed, with coolant then introduced between the input shaft and the housing 1.

When a lubricant or coolant composition is introduced into the coolant intake port 40, the coolant intake port 40 fluidly communicates with a passageway 43. The passageway 43 routes coolant to passageways 37, 44 and 45. The passageway 37 connects passageway 43 to housing interior 17. Passageway 46 fluidly communicates bearing 7 coolant cavity 31 with bearing 62 coolant cavity 32. Passageway 45 fluidly communicates with bearing 9 and with bearing 9 coolant cavity 33. Passageway 44 distributes coolant to the bearing 8 coolant cavity 34. Housing interior 17 fluidly communicates with bearing 62 coolant cavity 32, bearing 8 coolant cavity 34, bearing 7 coolant cavity 31, bearings 60 and 61, and coolant discharge port 18. Coolant flows from the housing interior 17 to the coolant discharge port 18, which receives a nozzle base assembly 38 and a nozzle 19. The nozzle base assembly may be a fixed assembly, as shown in FIG. 2, nozzle base assembly 38, or it may include means for adjusting the nozzle. For instance, in FIG. 3 the nozzle base assembly 54 includes a ball 55 and a socket 56, which allows the operator to adjust the position of the nozzle 57 to direct coolant flow. Also, in FIG. 5, the nozzle base assembly 138 includes a ball 181 and a socket 182, which allows the operator to adjust the position of the nozzle 183 to direct coolant flow. An alternative location of discharge port 18 may be accomplished by removing seal 63 to allow the coolant to flood the cutting tool and workpiece. Locating the coolant discharge port remote from the output shaft reduces the high pressure coolant requirements often found in through center coolant systems.

Another embodiment may meter the amount of coolant flowing from the coolant intake port 40 into the housing interior 17. Limiting the amount of coolant reaching the bearings and gears typically reduces the amount of power needed to drive the cutting tool. Flow control devices 91 and 92 may be incorporated into the passageways 44 and 43, respectively, to limit the coolant flow into the housing interior 17. Various means to restrict the flow in a passageway, such as a plug with an orifice, may be used as a flow control device. If additional coolant is required to cool and lubricate the cutter and the workpiece, then a second passageway fluidly communicating the coolant intake port 40 with the coolant discharge port 18 may be incorporated into the driven tool assembly.

Another embodiment may have a passageway fluidly communicating coolant intake port 40 with the coolant discharge port 18. A second passageway fluidly connects the first passageway with the bearings, transmission, and shafts of the driven tool assembly. Thus, one may limit flow to the bearings, transmission and shafts of the driven tool assembly while also delivering sufficient coolant to the cutter and workpiece. Also, referring to FIG. 2, on occasion it may be advantageous to increase the flow of coolant through passageway 45 to bearing 9 coolant cavity 33. This may be accomplished by placing flow control devices 90 and 91 in passageways 37 and 44, thereby increasing the flow through passageway 45.

In operation, the driven tool assembly shank 50 is clamped into a machine tool receiving mechanism, such as a turret. The coolant intake port 40 mates with a coolant providing port on a machine tool (not shown). The shank 36 of the cutting tool 23 is detachably mounted in the cullet chuck 22. The drive mechanism, whether the machine tool or the integral power supply, is then actuated. The rotation of the input shaft 2 causes the output shaft 3 and the cutting tool 23 to rotate as a result of power transmission by the transmission assembly 70. At the same time that the rotating cutting tool 23 is used to cut a workpiece, pressurized coolant is introduced into the coolant intake port 40 from a pressurized coolant source (not shown). The coolant enters the coolant intake port 40 and flows into passageway 43, and from there into passageways 37, 44 and 45. Coolant flows from passageway 45, to bearing 9 coolant cavity 33, between the input shaft 2 and the housing 1, and into the bearing 7 coolant cavity 31. From the coolant cavity 31, coolant flows through bearing 7 into the housing interior 17, and through passageway 46 into the bearing 62 coolant cavity 32. Coolant flows from the bearing 62 coolant cavity 32, through bearing 62 and into the housing interior 17. Coolant flows from passageway 44 to the bearing 8 coolant cavity 34, through bearing 8, and into the housing interior 17. From the housing interior 17, the coolant flows through bearings 60 and 61 before exiting the driven tool assembly through the coolant discharge port 18 and nozzle 19.

The above described flow of coolant cools and lubricates the bearings and gears and also cools and lubricates the cutting tool and workpiece. Typically, one may expect a continuous duty cycle and excellent bearing life in the coolant lubricated driven tool assembly, even with the use of water based coolants. The coolant may be any one of a variety of coolants compatible with the cooling and lubrication requirements of the cutter and workpiece and also compatible with the materials of which the bearing, gears and any other parts of the driven tool assembly requiring lubrication and cooling by the coolant are made. Spent coolant may be reclaimed and recycled through a filtration system. Typically, a water or an oil based coolant may be used with the driven tool assembly, and the removal of particles larger than 5 microns typically is sufficient to protect the driven tool assembly from contaminants. Water based coolants are particularly desirable, because of their cost and their ability to cool and lubricate the gears and bearings of the driven tool assembly and the cutting tool and workpiece.

In another embodiment shown in FIG. 5, the driven tool assembly generally comprises a housing 101, an input shaft 102 rotatably mounted in housing 101, and an output shaft 103 rotatably mounted in housing 101. The distal end 104 of the input shaft 102 includes a drive tang 105 which is receivable into a complementary shaped recess of a machine tool drive mechanism (not shown). Alternatively, similar to FIG. 3, the driven tool assembly may be provided with its own means for providing rotatable power 80 to the input shaft 102, such as a hydraulic or electric motor. Referring again to FIG. 5, the housing 101 includes a shank 150 for mounting the driven tool assembly 200 to a machine tool (not shown). Typically, the shank 150 is clamped into the turret of a machine tool. A locating device 139 is slideably attached to the housing 101 and mates with the machine tool (not shown). A groove 151 is concentrically disposed on the shank 150 for receiving an O-ring 152. The input shaft 102 further includes a proximal end 106 rotatably mounted in a wall of the driven tool assembly housing 101 by means of a rotary bearing 107. A locking washer 112 and locknut 113 secure bearing 107 against the input shaft shoulder 116. The distal end 104 of the input shaft 102 is rotatably mounted in the housing 101 by bearing 109. A seal 110 is disposed between the shank 150 portion of the housing 101 and the input shaft 102 for minimizing coolant leakage into the driven tool assembly drive mechanism. A gear 111 for transmitting power from the input shaft 102 to the output shaft 103 is secured to the proximal end 106 of input shaft 102 by snap ring 147.

The output shaft 103 has a proximal end 120 and a distal end 121. The distal end 121 of the output shaft 103 is rotatably mounted in a wall of the housing 101 by means of two rotary bearings 160 and 161 and is further provided with a seal 163 disposed of between the housing 101 and the output shaft 103 for minimizing coolant leakage. A locking washer 167 and locknut 166 secure bearings 160 and 161 against the output shaft shoulder 165. The proximal end 120 of the output shaft 103 is rotatably mounted in housing 101 by a bearing 162. A gear 164 for receiving rotatable power transmitted from the gear 111 disposed on the input shaft 102 is disposed on the proximal end 120 of the output shaft 103. A locking washer 168 and locknut 169 secure the gear 164 against proximal output shaft shoulder 172.

The distal end 121 of the output shaft 103 includes an integral collet chuck 122 for detachably holding the shank end 136 of a cutting tool 123. Other tool holders for attaching cutting tools to the input shaft may be utilized. For example, an output shaft may have means, such as threads, for receiving a detachable collet chuck or other tool holding device. The collet chuck 122 has a generally tubular chuck body 124 that receives a tubular collet 125. The collet 125 terminates in a beveled edge 126 for flexing the distal end of the collet inwardly. A locknut 127 is concentrically disposed around the distal end of collet 125 and the chuck body 124. Wrench receiving means 128 are circumferentially disposed on the locknut 127 to facilitate the turning thereof. As depicted in FIG. 1, one embodiment of the wrench receiving means provides a series of longitudinally oriented slots 328 for receiving a spanner wrench circumferentially disposed on the locknut 327. Alternatively, the locknut 327 may have other wrench receiving means, such as wrench flats, circumferentially disposed on the locknut 327. The distal end of the locknut 127 has a beveled edge 153 complementary in shape to the beveled edge 126 of the collet 125. The inner diameter of the proximal end of the locknut 127 is circumscribed by screw threads 129 engageable by screw threads 130 circumscribing the distal end of the chuck body 124. When the locknut 127 is tightened, the beveled edge 153 of the locknut 127 wedgingly squeezes the distal end of the collet 125 inward such that the inner diameter of the collet 125 tightly grips the shank 136 of the cutting tool 123. In order to render the collet 125 rotatably compressible by the beveled edge 153 of the locknut 127, a plurality of longitudinally orientated slots are provided around the circumference of the collet 125.

In the embodiment shown in FIG. 5, the transmission 170 utilizes gears 111 and 164 for transmitting power from the input shaft to the output shaft. The transmission may transmit power from the input shaft 102 to the output shaft 103 by a variety of means, including gears, couplings, sprockets and a chain, direct drives, or any other mechanism available to rotatably transmit power from one shaft to another. Also, the sizes of the gears 111 and 164 may be varied to produce either a higher tool speed or greater torque.

Housing 101 contains a coolant intake port 140. A groove 141 circumscribes the coolant intake port 140 and receives an O-ring 142. The O-ring 142 provides a coolant seal between the driven tool assembly and the turret (not shown). While this embodiment shows the coolant intake port disposed adjacent to the input shaft, the coolant intake port may be disposed in a variety of locations. For instance, the input shaft may have a continuous axial bore from the distal end of the input shaft to the proximal end of the input shaft. In such an embodiment the machine tool introduces coolant into the distal end of the input shaft, and the coolant flows through the input shaft, out of the proximal end of the input shaft and into the housing interior. By way of another example, the seal 110 may be removed, with coolant then introduced between the input shaft and the housing 101.

When a coolant is introduced into the coolant intake port 140, the coolant intake port 140 fluidly communicates through passageway 143 with passageway 145 and with passageway 137. Passageway 145 fluidly communicates with the bearing 109 coolant cavity 133. Passageway 137 fluidly connects to housing interior 117. The housing interior 117 fluidly communicates with the bearing 162 coolant cavity 132 via passageway 146 and also with upper coolant cavity 131. The coolant discharge port 118 communicates with the upper coolant cavity 131. The coolant discharge port 118 receives a nozzle base assembly 138. The nozzle base assembly 138 may be a fixed assembly, as shown in FIG. 2 (nozzle base assembly 38), or it may include means for adjusting the nozzle. For instance, in FIG. 5 the nozzle base assembly 138 includes a ball 181 and a socket 182, which allows the operator to adjust the position of the nozzle 183 to direct flow of the coolant.

Another embodiment may meter the amount of coolant flowing from the coolant intake port 140 into the housing interior 117. Limiting the amount of coolant that reaches the bearings and gears reduces the amount of power needed to drive the cutting tool. A flow control or orifice 190 may be incorporated into the passageway 143 to limit the coolant flow into the housing interior 117. If additional coolant is required to cool and lubricate the cutter and the workpiece, then a second passageway fluidly communicating the coolant intake port 140 with the coolant discharge port 118 may be incorporated into the driven tool assembly.

Another embodiment may have a passageway fluidly communicating coolant intake port 140 with the coolant discharge port 118. A second passageway fluidly connects the first passageway with the bearings, transmission, and shafts of the driven tool assembly. Thus, one may limit flow to the bearings, transmission and shafts of the driven tool assembly while also delivering sufficient coolant to the cutter and workpiece. Also, on occasion it may be advantageous to increase the flow of coolant through passageway 145 to the bearing 109 coolant cavity 133 and bearing 109. This may be accomplished by placing flow a flow control device 192 in passageway 137, thereby increasing the flow through passageway 145.

In operation, the driven tool assembly shank 151 is clamped into a machine tool receiving mechanism, such as a turret. The coolant intake port 140 mates with a coolant providing port on a machine tool (not shown). The shank 136 of a cutting tool 123 is detachably mounted in the cullet chuck 122. The drive mechanism, whether a machine tool or an integral power supply, is then actuated. The rotation of the input shaft 102 causes the output shaft 103 and the cutting tool 123 to rotate as a result of power transmission by the transmission assembly 170. At the same time that the rotating cutting tool 123 is used to cut a workpiece, pressurized coolant is introduced into the coolant intake port 140 from a pressurized coolant source (not shown). The coolant enters coolant intake port 140 and flows into passageways 143, and then into passageways 137 and 145. From passageway 137, coolant flows into the housing interior 117. Coolant flows from passageway 145, to bearing 109, between the input shaft 102 and the housing 101 and into the housing interior 117. From the housing interior 117, the coolant flows through bearing 107, into the upper coolant cavity 131, whereby it lubricates and cools the transmission 170. Coolant also flows from the housing interior 117 through passageway 146, into the bearing 162 coolant cavity 132, through bearing 162, and into the upper coolant cavity 131. From the upper coolant cavity 131 the coolant flows through bearings 160 and 161 before exiting the driven tool assembly through the coolant discharge port 118 and the nozzle 183. The above described flow of coolant cools and lubricates the bearings and gears and also cools and lubricates the cutting tool and workpiece. As discussed previously, a variety of coolants, including water or oil based coolants, may be used for this process and spent coolant may be filtered and recycled.

In the embodiment of FIG. 6, the driven tool assembly generally comprises a shaft 202 rotatably mounted in a housing 201. The input end 204 of the shaft 202 includes a drive tang 205 which is receivable into a complementary shaped recess of a machine tool drive mechanism (not shown). Alternatively, similar to FIG. 3, the driven tool assembly may be provided with its own means for providing rotatable power 80 to the input end 204 of the shaft 202, such as a hydraulic or electric motor. The housing 201 includes a shank 250 for mounting the driven tool assembly 300 to a machine tool (not shown). Typically, the shank 250 is clamped into the turret of a machine tool. A locating device 239 is slideably attached to the housing 201 and mates with the machine tool (not shown). A groove 251 is concentrically disposed on the shank 250 for receiving an O-ring 252. The shaft further includes an output end 206 rotatably mounted in a wall of the driven tool assembly housing 201 by means of rotary bearings 207 and 208. A locking washer 212 and locknut 213 secure bearings 207 and 208 against the shaft shoulder 216. The input end 204 of the shaft 202 is rotatably mounted in the housing 201 by bearing 209. A seal 210 is disposed between the shank 250 portion of the housing 201 and the input shaft 202 for minimizing coolant leakage into the driven tool assembly drive mechanism.

The output end 206 of the shaft 202 includes an integral collet chuck 222 for detachably holding the shank 236 end of a cutting tool 223. Other tool holders for attaching cutting tools to the input shaft may be utilized. For example, an output shaft may have means, such as threads, for receiving a detachable collet chuck or other tool holding device. The collet chuck 222 has a generally tubular chuck body 224 that receives a tubular collet 225. The collet 225 terminates in a beveled edge 226 for flexing the distal end of the collet inwardly. A locknut 227 is concentrically disposed around the distal end of the collet 225 and the chuck body 224. Wrench receiving means 228 are circumferentially disposed on the locknut 227 to facilitate the turning thereof. As depicted in FIG. 1, one embodiment of the wrench receiving means provides a series of longitudinally oriented slots 328 for receiving a spanner wrench circumferentially disposed on the locknut 327. Alternatively, the locknut 327 may have other wrench receiving means, such as, wrench flats, circumferentially disposed on the locknut 327. The distal end of the locknut 227 has a beveled edge 253 complementary in shape to the beveled edge 226 of the collet 225. The inner diameter of the proximal end of the locknut 227 is circumscribed by screw threads 229 engageable by screw threads 230 circumscribing the distal end of the chuck body 224. When the locknut 227 is tightened, the beveled edge 253 of the locknut 227 wedgingly squeezes the distal end of the collet 225 inward such that the inner diameter of collet 225 tightly grips the shank 236 of a cutting tool 223. In order to render the collet 225 rotatably compressible by the beveled edge 253 of the locknut 227, a plurality of longitudinally orientated slots are provided around the circumference of the collet 225.

The transmission 270 may be an integral part of the input and the output shafts, as in FIG. 6, the input and output shafts are a single piece such that the transmission is incorporated into the shafts.

The housing 201 contains a coolant intake port 240. Groove 241 circumscribes the coolant intake port 240 and receives an O-ring 242. The O-ring 242 provides a coolant seal between the driven tool assembly and the turret. While this embodiment shows the coolant intake port disposed adjacent to the input shaft, the coolant intake port may be disposed in a variety of locations. For instance, the shaft may have an axial bore starting at the input end 204 of the shaft 202 and terminating at a diametral bore perpendicular to the axial bore and fluidly communicating with the housing interior 217. In such an embodiment, the machine tool introduces coolant into the distal end of the input shaft. The coolant may flow through the input shaft axial bore, into the diametral bore, and then into the housing interior 217. By way of another example, the seal 210 may be removed, with coolant then introduced between the input shaft 202 and the housing 201.

The coolant intake port 240 fluidly communicates with passageways 245 and 237 via passageway 243. Passageway 245 fluidly communicates with bearing 209 coolant cavity 233 and with bearing 209. Passageway 237 fluidly communicates housing interior 217. The coolant discharge port 218 intersects housing interior 217. The coolant discharge port 218 receives a nozzle base assembly 238. The nozzle base assembly may be a fixed assembly, as shown in FIG. 2 (nozzle base assembly 38), or it may include means for adjusting the nozzle. The embodiment depicted in FIG. 6, the nozzle base assembly includes a ball 281 and socket 282, which allows the operator to adjust the position of nozzle 219 to direct flow of the coolant.

As discussed previously, another embodiment may meter the amount of coolant flowing from the coolant intake port 240 into the housing interior 217. Limiting the amount of coolant that reaches the bearings and gears reduces the amount of power needed to drive the cutting tool. A flow control or orifice 290 may be incorporated into passageway 243 to limit the coolant flow into the housing interior 217. If additional coolant is required to cool and lubricate the cutter and the workpiece, then a second passageway fluidly communicating the coolant intake port 240 with the coolant discharge port 218 may be incorporated into the driven tool assembly.

Another embodiment may have a passageway fluidly communicating coolant intake port 240 with the coolant discharge port 218. A second passageway fluidly connects the first passageway with the bearings, transmission, and shafts of the driven tool assembly. Thus, one may limit flow to the bearings, transmission and shafts of the driven tool assembly while also delivering sufficient coolant to the cutter and workpiece. Also, on occasion it may be advantageous to increase the flow of coolant through passageway 245 to bearing 209. This may be accomplished by placing a flow control device 291 in passageway 237, thereby increasing the flow through passageway 245.

In operation, the driven tool assembly shank 250 is clamped into a machine tool receiving mechanism, such as a turret. The coolant intake port 240 mates with a coolant providing port on a machine tool (not shown). The shank 236 of the cutting tool 223 is detachably mounted in the cullet chuck 222. The drive mechanism, whether the machine tool or the integral power supply, is then actuated. The rotation of the shaft 202 causes the cutting tool 223 to rotate. At the same time that the cutting tool 223 rotated by the shaft 202 is used to cut a workpiece, pressurized coolant is introduced into the coolant intake port 40 from a pressurized coolant source (not shown). The coolant enters the coolant intake port 240 and flows into passageway 243. From passageway 243, coolant flows into passageways 245 and 237. From passageway 245, coolant flows to the bearing 209 coolant cavity 233, though bearing 209, between the shaft 202 and the housing 201, and into the housing interior 217. Coolant also flows from passageway 237 into the housing interior 217. From the housing interior 217, the coolant flows through bearings 207 and 208 before exiting the driven tool assembly through the coolant discharge port 218 and nozzle 219. The above described flow of coolant cools and lubricates the bearings and gears and also cools and lubricates the cutting tool and workpiece. As discussed previously, a variety of coolants may be used for this process, including water or oil based coolants, and spent coolant may be filtered and recycled.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and method, and illustrated examples shown and described. Accordingly, departures may be made from such details without departing from the scope or spirit of the invention.

What is claimed is:

1. A driven tool assembly comprising:
   a housing having at least one coolant intake port, at least one coolant discharge port, and a shank for mounting the driven tool assembly to a machine tool,
   an input shaft rotatably mounted in said housing,
   a seal disposed between said housing and said input shaft,
   an output shaft rotatably mounted in said housing,
   a transmission communicating with said input shaft and with said output shaft, whereby said transmission transmits power from said input shaft to said output shaft,
   at least one passageway in fluid communication with said coolant intake port and said coolant discharge port, said passageway also in fluid communication with said input shaft, said output shaft, and said transmission, whereby coolant lubricates and cools said shafts and said transmission while flowing from said coolant intake port to said coolant discharge port, and
   said coolant discharge port positioned remote from said output shaft.

2. The driven tool assembly defined in claim 1, further comprising at least one input shaft bearing aligning said input shaft in said housing and at least one output shaft bearing aligning said output shaft in said housing.

3. The driven tool assembly defined in claim 2, wherein said passageway is also in fluid communication with said input shaft bearing and said output shaft bearing.

4. The driven tool assembly defined in claim 1, further comprising at least one seal disposed between said housing and said output shaft.

5. The driven tool assembly defined in claim 1, further comprising an integral power source.

6. The driven tool assembly defined in claim 1, further comprising a nozzle affixed to said coolant outlet port.

7. The driven tool assembly defined in claim 1, further comprising a tool holder affixed to said output shaft.

8. The driven tool assembly defined in claim 2, wherein said transmission comprises a first gear affixed to said input shaft meshing with a second gear affixed to said output shaft.

9. The driven tool assembly defined in claim 2, further comprising at least one seal disposed between said housing and said output shaft.

10. The driven tool assembly defined in claim 2, further comprising an integral power source.

11. The driven tool assembly defined in claim 2, further comprising a nozzle affixed to said coolant outlet port.

12. The driven tool assembly defined in claim 2, further comprising a tool holder affixed to said output shaft.

13. A driven tool assembly, comprising
   a housing having at least one coolant intake port, at least one coolant discharge port, and a shank for mounting the driven tool assembly to a machine tool,
   at least one first bearing mounted in said housing,
   at least one second bearing mounted in said housing,
   an input shaft located concentrically within said first bearing,
   a seal disposed between said housing and said input shaft,
   an output shaft located concentrically within said second bearing,
   a transmission communicating with said input shaft and said output shaft, whereby said transmission transmits power from said input shaft to said output shaft,
   at least one first passageway in fluid communication with said coolant intake port and with said coolant discharge port, whereby coolant flows from said coolant intake port, through said first passageway, to said coolant discharge port,
   at least one second passageway in fluid communication with said first passageway and with input shaft, output shaft, first bearing, second bearing, and transmission, whereby coolant flowing through said second passageway lubricates and cools said input shaft, output shaft, first bearing, second bearing and transmission, and
   said coolant discharge port positioned remote from said output shaft.

14. The driven tool assembly defined in claim 13, wherein said transmission comprises a first gear affixed to said input shaft meshing with a second gear affixed to said output shaft.

15. The driven tool assembly defined in claim 13, further comprising at least one seal disposed between said housing and said output shaft.

16. The driven tool assembly defined in claim 13, further comprising an integral power source.

17. The driven tool assembly defined in claim 13, further comprising a nozzle affixed to said coolant outlet port.

18. The driven tool assembly defined in claim 13, further comprising a tool holder affixed to said output shaft.

19. A method for cooling and lubricating a driven tool assembly, comprising:

providing a driven tool assembly comprising a housing having at least one coolant intake port, at least one coolant discharge port, and a shank for mounting the driven tool assembly to a machine tool, an input shaft rotatably mounted in said housing, a seal disposed between said housing and said input shaft, an output shaft rotatably mounted in said housing, a transmission communicating with said input shaft and with said output shaft, at least one passageway in fluid communication with said coolant intake port and said coolant discharge port, said at least one passageway also in fluid communication with said input shaft, said output shaft, and said transmission, and said coolant discharge port positioned remote from said output shaft, distributing coolant to said coolant intake port, circulating coolant through at least one passageway to cool and lubricate said driven tool assembly, passing said coolant through said coolant outlet port, and cooling and lubricating a cutting tool and workpiece with said coolant exiting said coolant outlet port.

20. The method for cooling and lubricating a driven tool assembly according to claim 19, wherein said transmission comprises a first gear affixed to said input shaft meshing with a second gear affixed to said output shaft.

* * * * *